Figure 1:
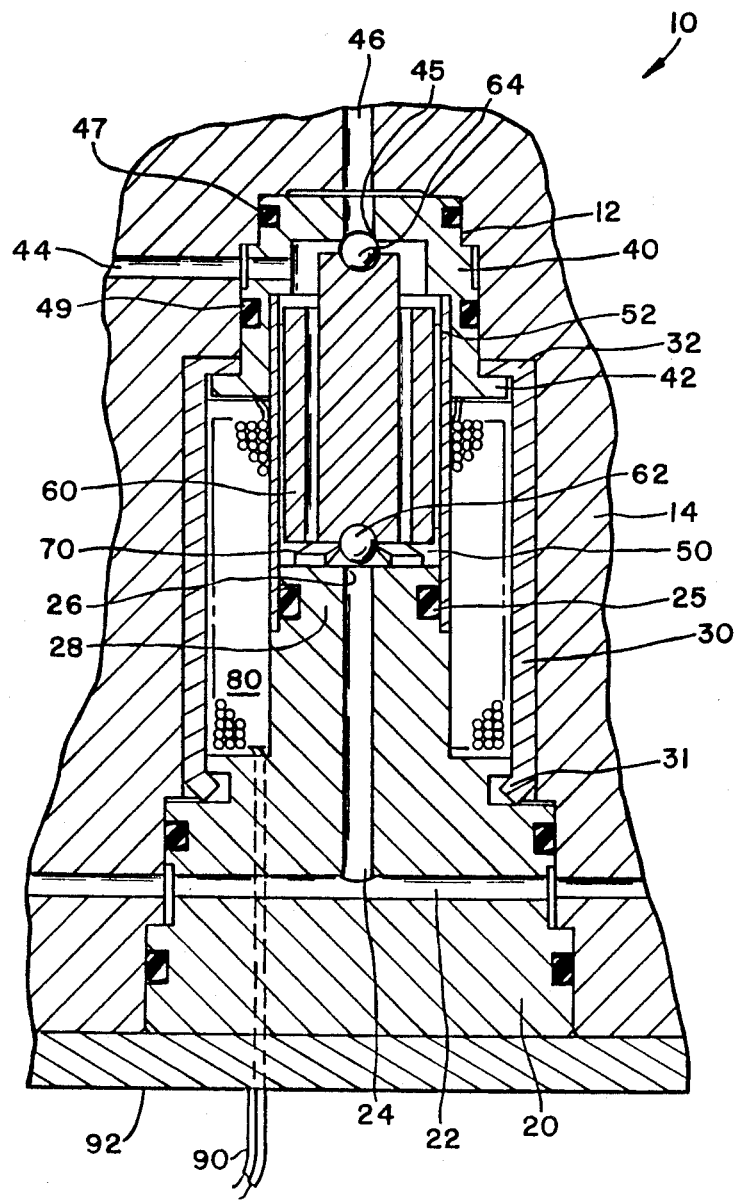

United States Patent [19]

Tackett

[11] Patent Number: 4,944,331

[45] Date of Patent: Jul. 31, 1990

[54] SOLENOID VALVE

[75] Inventor: Wendell D. Tackett, South Bend, Ind.

[73] Assignee: Allied-Signal Inc., Morristown, N.J.

[21] Appl. No.: 371,667

[22] Filed: Jun. 22, 1989

[51] Int. Cl.$^5$ .............................................. F15B 13/044
[52] U.S. Cl. .................................. 137/625.65; 303/119
[58] Field of Search ...................... 137/596.17, 625.65; 303/119

[56] References Cited

U.S. PATENT DOCUMENTS

| 3,529,620 | 9/1970 | Leiber .................... 137/625.65 X |
| 3,574,417 | 4/1971 | Howard et al. . |
| 3,880,476 | 4/1975 | Belart et al. . |
| 3,970,111 | 7/1976 | Brüne et al. . |
| 3,989,063 | 11/1976 | Brouwers et al. . |
| 4,102,526 | 7/1978 | Hargraves ................ 137/625.65 X |
| 4,123,118 | 10/1978 | Sato . |
| 4,141,597 | 2/1979 | Sato et al. . |
| 4,322,057 | 3/1982 | Yamanaka et al. ........ 137/625.65 X |
| 4,350,396 | 9/1982 | Mortimer . |
| 4,600,245 | 7/1986 | Watanabe . |
| 4,619,289 | 10/1986 | Tsuru et al. . |
| 4,668,024 | 6/1987 | Nakanishi et al. . |
| 4,679,589 | 7/1987 | Inden et al. . |
| 4,790,351 | 12/1988 | Kervagoret .................... 137/596.17 |

Primary Examiner—Gerald A. Michalsky
Attorney, Agent, or Firm—Larry J. Palguta; Ken C. Decker

[57] ABSTRACT

The solenoid valve (10) is received within a cavity (12) of a modulator body (14). The valve (10) includes a first opening (22) for fluid received from a master cylinder or pump, and a top part (40) has second (44) and third (46) openings. The second opening (44) communicates fluid with a brake circuit and the third opening (46) communicates fluid with a sump circuit. An end member (20) includes the first opening (22) which extends transversely therethrough and communicates with a longitudinal opening (24) that communicates the first opening (22) with a chamber (50) contained in an upper body member (30). Disposed within the chamber (50) is a movable armature (60) having at one end a first valve (62) which may sealingly engage a seat (26) of the longitudinal opening (24) and at a second end a second valve (64) which may sealingly engage a seat (45) of the third opening (46). The armature (60) includes a pair of parallel axial passages (63) permitting fluid flow therethrough. A wave washer (70) disposed between the end member (20) and armature (60) biases the armature (60) so that the second valve (62) normally closes the seat (45) of the third opening (46). An electrical coil (80) is disposed about the end member (20) and armature (60) and when energized causes the armature (60) to be displaced so that the first valve (62) closes the seat (26) of the longitudinal opening (24) and the second valve (64) opens the seat (45) of the third opening (46). Subsequent energization of the electrical coil (80) and fluid pressure received from the pump via the first opening (22) results in modulation of the armature (60).

7 Claims, 1 Drawing Sheet

SOLENOID VALVE

The present invention relates generally to a solenoid valve, and in particular to a three-way, two-position solenoid valve which may be utilized in a vehicle adaptive braking system.

The present invention relates to solenoid valves which may be utilized for the modulation of brake fluid in an adaptive braking system. Brown U.S. Pat. No. 4,620,565 and Kervagoret U.S. Pat. No. 4,790,351 illustrate solenoid valves that may be used in adaptive braking systems. Typically, three-way, two-position solenoid valves are activated by means of an electrical coil so that the brake pressure transmitted to the brake by the master cylinder may be decayed through a sump outlet which is opened by the displacement of an armature. It is desirable to maximize the design to provide a highly efficient, fast acting, and easily manufacturable solenoid valve for utilization in adaptive braking systems. It is preferable that the entire valve be buried within the adaptive braking system modulator so that the only external part is the electrical leads. It is advantageous to have fluid flow through the armature, to require as few parts as necessary to construct the solenoid which also results in ease of assembly, and particularly desirable that the solenoid be a fast operating solenoid so as to effect the modulation of fluid pressure supplied by the adaptive braking system.

The present invention provides a solution to the above problems by providing a solenoid valve, comprising a body having at a first end a first opening and at a second end second and third openings, the first end including a base member containing said first opening which communicates with a longitudinal opening extending in said base member, an armature disposed movably between said base member and second end, the armature comprising a longitudinal member having a first valve which may sealingly engage the longitudinal opening of the base member and a second valve which sealingly engages the third opening, a pair of parallel axial passages extending through the armature in order to permit fluid flow through the armature, resilient means disposed between said armature and base member and biasing said armature so that the second valve normally engages sealingly the third opening, the base member and second end of the body defining therebetween a chamber which houses said armature and communicates with the second and third openings, and coil means disposed about said body and for effecting displacement of said armature, so that energization of said coil means causes said armature to be displaced such that the second valve opens said third opening and said first valve sealingly engages said longitudinal opening and subsequent energization of the coil means in combination with fluid pressure received at the first opening causes said armature to modulate the valves between open and closed positions.

The invention will now be described by way of example with reference to the accompanying drawing in which:

FIG. 1 is a view in longitudinal section of a solenoid valve according to the invention.

The solenoid valve of the present invention is indicated generally by reference numeral 10 in FIG. 1. Solenoid valve 10 is received within a cavity 12 of modulator body 14. Cavity 12 is a stepped cavity and provides appropriate passages for communication with openings of the solenoid valve. Solenoid valve 10 comprises an end member 20 which is coupled to an upper body member 30 by means of bent-over end members 31. Upper body member 30 includes a second end or top member 40 which is a generally cylindrically shaped part with a stepped diameter and includes a radially extending flange 42 which engages a radially extending flange 32 of upper body member 30. End member 20 includes a first opening 22 which extends transversely through member 20, and seals 23, 27 which engage sealingly the surface of cavity 12 of modulator body 14. Opening 22 communicates with aligned openings in the modulator body 14, each end of opening 22 communicating with the same fluid pressure source or with separate fluid pressure sources. For example, the same fluid pressure source would be either a master cylinder or a pump activated during adaptive braking system operation. Different pressure sources would be one lateral side of opening 22 communicating with the master cylinder and the opposite lateral side of opening 22 communicating with a pump that operates during adaptive braking system operation. In any event, whether the fluid pressure is provided via the same opening or via opposite side openings the end result is that the fluid pressure is communicated to a longitudinal opening 24. Longitudinal opening 24 terminates in a valve seat 26 at end 28 of end member 20. End member 20 and top part 40 defined therebetween a chamber 50 which receives fluid pressure via longitudinal opening 24. Top part 40 includes a second opening 44 which communicates with a brake circuit and a third opening 46 which communicates with a sump circuit. Disposed about top part 40 are seals 47 and 49 which sealing engage cavity 12. Located within chamber 50 is an armature 60 and resilient means or wave washer 70. Armature 60 comprises a longitudinal member having a first ball valve 62 disposed opposite valve seat 26 and a second ball valve 64 disposed opposite valve seat 45. A pair of parallel axial passages 63 extend longitudinally through armature 60. Wave washer 70 biases armature 60 toward third opening 46 so that normally second ball valve 64 sealingly engages valve seat 45 to prevent fluid flow to the sump circuit. Top part 40 engages a cylindrical sleeve 52 which is generally cylindrically shaped and extends longitudinally into engagement with end member 20 and end member seal 25. Sleeve 52 defines a portion of chamber 50. An electrical coil 80 is disposed about armature 60, cylindrical sleeve 52, and end 28 of end member 20.

Solenoid valve 10 illustrated in FIG. 1 operates according to the following description of operation. During normal braking, fluid pressure is received from the master cylinder via first opening 22. Fluid flows through longitudinal opening 24, into cavity 50, and through axial passages 63. Second ball valve 64 sealingly engages valve seat 45 so that fluid pressure must exit second opening 44 which communicates with the brake circuit. During adaptive braking system operation, there will initially be a large pressure being communicated to the brakes which results in an incipient skidding condition. Therefore, the first function to be performed by the solenoid valve is to provide for a decay of fluid pressure away from the brake circuit communicating with second opening 44. An electrical control unit (not shown) sends an energizing signal to coil 80 which, due to magnetic attraction, causes armature 60 to be displaced downwardly toward valve seat 26. First ball valve 62 engages sealingly valve seat 26 and second ball valve 64 moves away from valve seat 45 to permit fluid to flow from the brake circuit and through opening 46 to the sump circuit. When the adaptive braking system control commences, a pump is energized and provides an increase in fluid pressure at opening 22. As the electronic control unit (not shown) transmits signals in response to wheel operation characteristics, the armature will be permitted, in accordance with the energization level of coil 80, to move back towards its normal position wherein valve seat 45 is closed by ball valve 64 so that fluid pressure from the pump may be transmitted through parallel axial passages 63 to the upper portion of cavity 50 and out to the brake circuit via second opening 44. The armature 60 will be modulated between valve seat 45 of third opening 46 and valve seat 26 of longitudinal opening 24 during adaptive braking system operation. This will effect the build and decay functions desired for adaptive braking system modulation of hydraulic fluid pressure.

The solenoid valve of the present invention solves the problems described above by providing a solenoid valve that has its entire structure buried within the cavity of the modulator. The only structure exterior of the modulator is the electrical leads 90 which, because they emanate from a flat face 92 of the solenoid, are inherently easier to interface with electrical connections. This more easily accommodates attachment to an electronic control unit. The solenoid valve utilizes a non-magnetic wave washer instead of a coil spring, which is less expensive and easier to ship and assemble. The hydraulic fluid is permitted to flow through the solenoid, specifically the parallel axial passages 63 of the armature 60, and this results in the elimination of any stagnant fluid area which is present in some solenoid valves. This also allows for more versatile packaging because of improved bleed characteristics, and the fluid flowing through the solenoid promotes improved cooling of the electrical coil which results in a more consistent mode of operation. The ball valves 62 and 64 are embedded on both sides of the armature and this reduces the number of parts required for such a construction. The solenoid valve of the present invention will provide a fast operating solenoid valve because a plunger which may be present in the sump flow path is not utilized. Thus, the hydraulic load which must be overcome and which relates to the diameter of the sump flow path valve seat 45, is reduced and provides a faster acting valve. The modulator is easier to retain within the cavity of the modulator housing because the only force pushing against the solenoid is fluid pressure from the sump. This reduces the size and number of fasteners that might be required. Of course, the flush mounting of the solenoid to the modulator so that only the wires extend therefrom, provides a more simplistic mounting technique. The solenoid valve provides a structure that requires fewer parts for final assembly, is easier to assemble, and has an improved fail-safe condition in that fewer seals, connections, and alignment problems are present.

I claim:

1. A solenoid valve, comprising a body having at a first end at least a first opening and at a second end second and third openings, the first end including a base member containing said first opening which extends laterally and communicates with a longitudinal opening extending in said base member, an armature disposed movably between said base member and said second end, the armature comprising a longitudinal member having a first valve which may sealingly engage the longitudinal opening of the base member and a second valve which sealingly engages the third opening, a pair of parallel axial passages extending through the armature in order to permit fluid flow through the armature, a wave washer disposed between said armature and base member and biasing said armature so that the second valve normally engages sealingly the third opening, the base member and second end of the body defining therebetween a chamber which houses said armature, the second and third openings communicating with said chamber, and coil means disposed about said armature and for effecting displacement of said armature, so that energization of said coil means causes said armature to be displaced such that the second valve opens said third opening and said first valve sealingly engages said longitudinal opening and subsequent energization of the coil means in combination with fluid pressure received at the first opening causes said armature to modulate the valves between open and closed positions.

2. The solenoid valve in accordance with claim 1, further comprising a cylindrical sleeve disposed within said chamber and extending over an end of said base member.

3. The solenoid valve in accordance with claim 2, further comprising a seal disposed about the base member and sealingly engaging an interior surface of said cylindrical sleeve.

4. The solenoid valve in accordance with claim 3, wherein the body comprises an upper body member which is attached to the base member by means of bent-over end members.

5. The solenoid valve in accordance with claim 4, wherein said second opening extends laterally through the body and communicates with the chamber.

6. The solenoid valve in accordance with claim 5, wherein the upper body member includes sealing means thereabout.

7. The solenoid valve in accordance with claim 6, wherein the second end comprises a top member of said upper body member and which comprises a stepped diameter cylinder having a radially extending flange which engages a radially extending flange of the body member.

* * * * *